United States Patent [19]

East

[11] Patent Number: 5,044,490

[45] Date of Patent: Sep. 3, 1991

[54] BELT CONVEYOR IDLER SUPPORT FRAME

[75] Inventor: Charles F. East, Van Vleet, Miss.

[73] Assignee: FMC Corporation, Chicago, Ill.

[21] Appl. No.: 444,461

[22] Filed: Dec. 1, 1989

[51] Int. Cl.$^5$ .............................................. B65G 15/08
[52] U.S. Cl. ................................................... 198/830
[58] Field of Search ............. 198/828, 830; 193/35 R, 193/37

[56] References Cited

U.S. PATENT DOCUMENTS

| 2,869,710 | 1/1959 | Stewart | 198/830 |
| 2,964,155 | 12/1960 | Flowers et al. | 193/35 R |
| 3,262,551 | 7/1966 | De Waal | 198/830 |
| 4,186,830 | 2/1980 | Corey et al. | 193/37 |

FOREIGN PATENT DOCUMENTS

| 837516 | 2/1939 | France | 198/830 |
| 85007 | 5/1957 | Netherlands | 198/830 |

Primary Examiner—Joseph E. Valenza
Attorney, Agent, or Firm—Douglas W. Rudy; Richard B. Megley

[57] ABSTRACT

An idler roller support frame has a support beam longitudinally parallel to an idler roller or a plurality of idler rollers. The support beam has a structural contour providing tension flange zones and compression flange zones adjacent the tension flange zones. The compression flange zones gradually increase in magnitude frame the end portions of the support beam to the central area of the support beam.

6 Claims, 2 Drawing Sheets

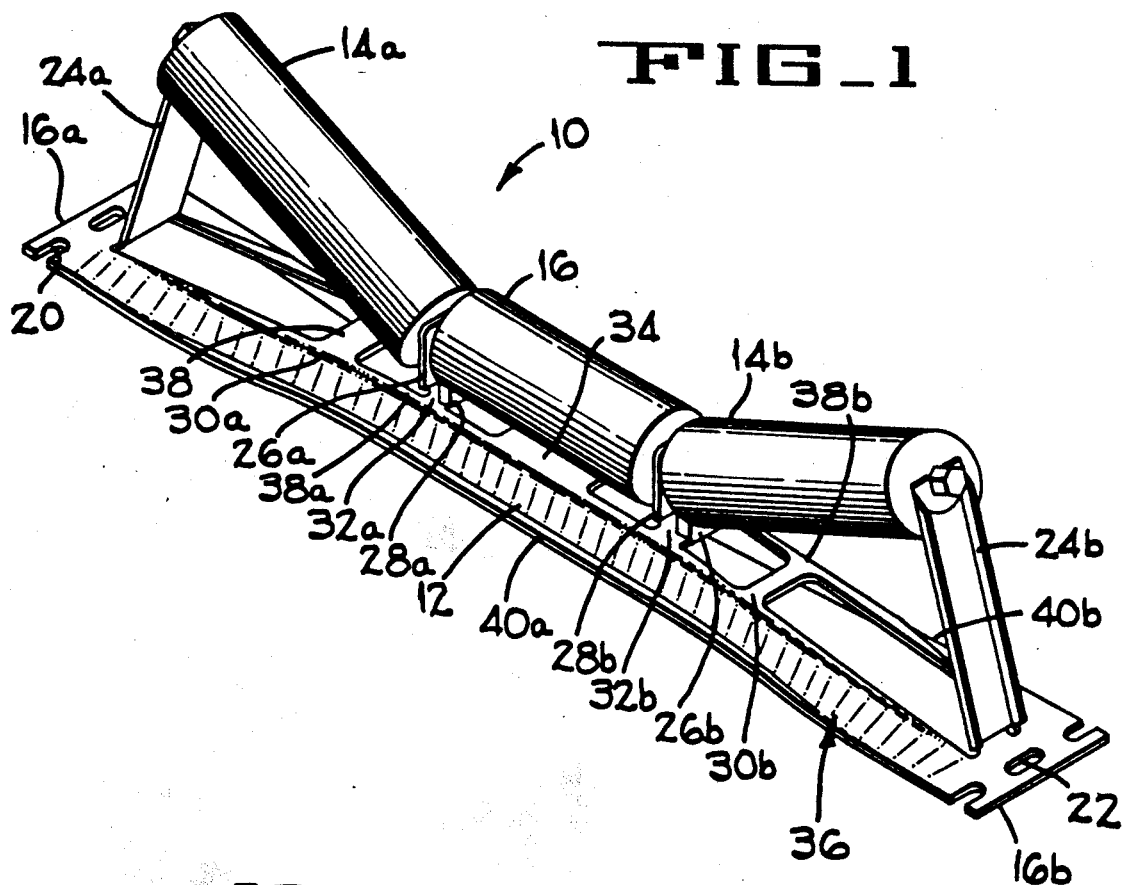

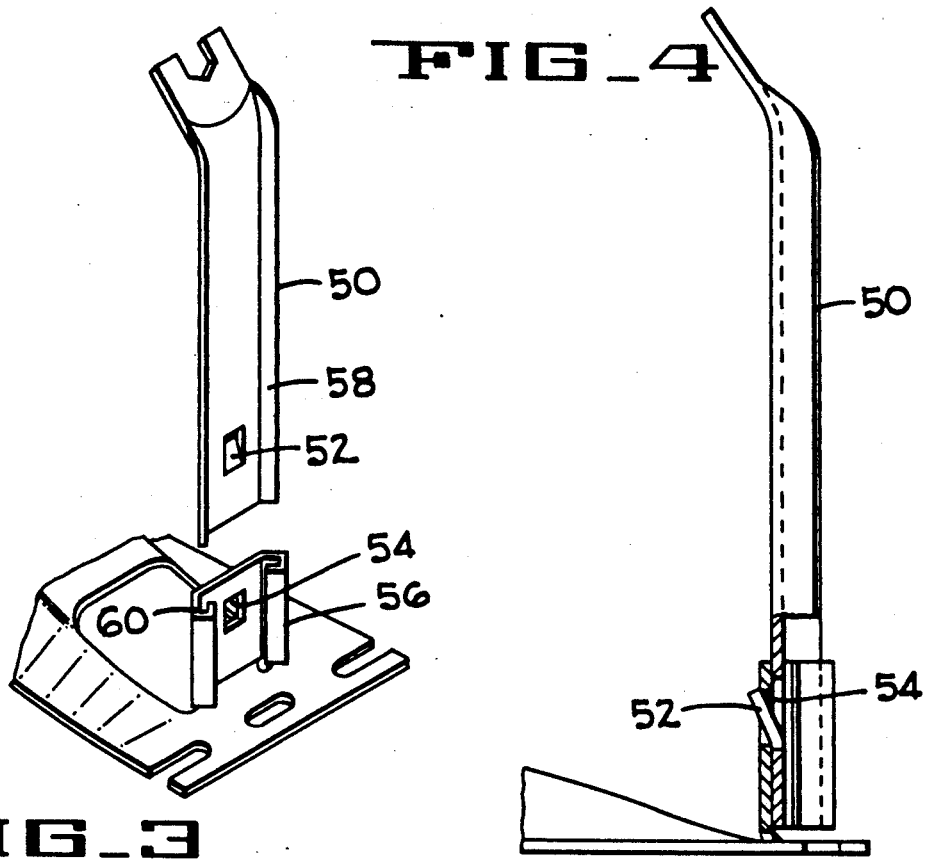

BELT CONVEYOR IDLER SUPPORT FRAME

BACKGROUND OF THE INVENTION

This invention has to do with bulk material handling systems including conveyor belts supported on belt conveyor idler support frames. More specifically, this invention has to do with the idler support frame itself and a specific construction of an idler support frame for supporting one or multiple idler rolls on such frame which in turn is then used to support a conveyor belt for transporting bulk materials as stated above.

In the overland transportation of bulk materials it has been found that the use of long stretches of conveyor are a cost efficient and reliable method of transporting materials from place to place. It is typical to see conveyor belt systems of more than a mile in length conveying materials from a sand or gravel pit to a processing station. Rather than utilizing trucks or rail cars these relatively long runs of conveyor belts provide low cost operation as well as set-up and positioning flexibility. It is well known in this art to utilize a multitude of idler support frames to support and partially form a flexible conveyor belt into a moving trough upon which sand, gravel, coal, grain and other bulk materials can be transported.

BRIEF DESCRIPTION OF THE PRIOR ART

It is well known in the prior art to manufacture idler support frames for supporting one or a multiple number of idler rolls by fabricating angle iron, sheet metal and occasionally stamped or cast uprights together to form an idler support frame. These fabrications are usually welded structures made up of numerous pieces including at least a single transverse member with a pair of mounting pads, outer roll support brackets and inner roll support brackets fastened thereto. As stated above, it is typical to have the support brackets and mounting pads welded to the transverse support beam. Such a construction is labor-intensive resulting in a product that is expensive to manufacture due to the amount of time necessary to weld all the components into a unified idler roll support frame. Furthermore it has been found that such structures require significant structural support beams in order to sustain the integrity of the idler roll support frame over a relatively long life cycle.

SUMMARY OF THE INVENTION

The invention herein is an idler roll support frame that includes an elongated support beam having a pair of structural contour elements supporting an upper compression flange zone from a lower tension flange zone and at least one set of roll support brackets integral with the support beam inboard of the structural contour elements.

Several alternative embodiments of the invention are also presented. These alternatives generally relate to the outboard supports of the outer roll mounting elements.

DESCRIPTION OF THE DRAWING FIGURES

This invention will be readily understood from a perusal of the drawing figures in which:

FIG. 1 is an orthographic projection of an idler roll support frame having three idler rolls supported thereon;

FIG. 2 is an orthographic projection of an alternative embodiment;

FIG. 3 is another alternative embodiment of an idler frame similar to that shown in FIG. 2 with two of the parts separated to show an alternative attachment means;

FIG. 4 is a partially broken away and sectioned view of the alternative environment shown in FIG. 3 with the parts mated together;

FIG. 5 is a plan view of the support beam shown in FIG. 2 at an intermediate manufacturing stage;

FIG. 6 is a plan view of the support beam shown in FIG. 2 after it has been finally formed; and FIG. 7 is a side elevation view of the FIG. 6 piece.

DETAILED DESCRIPTION OF THE INVENTION

The overall concept of this invention can best be seen by looking at FIG. 1 which shows a belt conveyor idler roll support frame of a simple type supporting three idler rolls in the position they would be in a normal field installation. The idler rolls or rollers are longitudinally parallel to the major longitudinal axis of the support frame's support beam 12. That is, the idler roller's axial center lines are not generally transverse to the major axis of the support frame's support beam and would generally lie in a vertical plane extending upwardly from the longitudinal plane of the support beam. The belt conveyor idler roll support, generally 10, includes a support beam structure 12 of a generally elongated character extending from a first mounting pad 16a to a similar mounting pad 16b at the other end of the support beam 12. The mounting pads may typically be equipped with attachment means shown as apertures such as 20 and 22, which can be either elongated slotted holes, slotted holes extending to the edge of the support beam, round holes, square holes or other apertures or attaching means that would allow the support beam to be restrained on a host member in a secure manner as is well known in the art.

Immediately inboard of the mounting pads at each end of the support beam are outboard outer roll support brackets 24a and 24b. These outboard outer roll support brackets have been formed integrally from material in the interior section of the support beam during the formation of the support beam. The outboard outer roll support brackets are connected at a lower end thereof to the support beam in an area generally proximate to the mounted pads at each end of the support beam. These brackets are thus formed integrally with the support beam. The side edges and the top edge of the outboard outer roll support brackets result from the support brackets being cut out of the support beam blank during forming after the support brackets have been cut out of the support beam blank leaving the attachment point at a lower outboard end of the outboard outer roll support brackets. The edges of such outboard outer roll support brackets may be bent or folded such as shown in FIG. 1 to increase the structural rigidity of the outboard outer roll support brackets. The former inboard edge of the outboard outer roll support brackets, which, upon the bracket being bent upwardly during the forming of the support-beam becomes the upper most portion of the outboard outer roll support bracket. The outboard outer roll support bracket may be formed with an aperture, groove, slot or other idler roll axle retaining or accepting means to support the outboard end of an outer roll such as 14a or 14b.

The inboard end of the outer rolls 14a and 14b are likewise supported in support brackets. Such inboard outer roll support brackets, such as 26a and 26b, are likewise formed of material "punched out" and bent upwardly from the support beam blank. The inboard outer roll support brackets will remain attached at their base to the main portion of the support beam. The inboard outer roll support brackets will also have axle accepting means to interface with the axle at the inboard end of the outer rolls such as 14a and 14b.

Between the outer rolls 14a and 14b there may be positioned a center roll such as 16, or multiple center rolls (not shown) which would characteristically be similar to the center roll illustrated in FIG. 1. The center roll 16 is supported at its axle ends by center roll support brackets such as 28a and 28b which, like the inboard outer roll support brackets, are formed by cutting the support beam blank on three sides surrounding the center roll support brackets such that the center roll support brackets 28a and 28b can be bent upwardly from the normal plane of the support beam blank. The brackets will remain attached to the support beam blank at the base of the center roll support brackets. These central roll support brackets 28a and 28b are also provided with axle receiving means to receive the axle of the center roll such as 16.

It should be clear from looking at FIG. 1 that the outboard outer roll support brackets 24a, 24b, the inboard outer roll support brackets 26a and 26b and the center roll support brackets 28a and 28b have all been cut out of the normal plan surface of the support beam blank and bent upwardly to provide support means for the outer rolls and the center roll. It should also be noticed that nuances of the support brackets such as the means for receiving the axles of the rollers and the bent or folded over edges of, not only the outboard outer roll support brackets 24a and 24b, but also of the inboard outer roll support brackets and the center roll support brackets can be bent or folded in a similar manner to improve the rigidity and structural capability of these roll support brackets.

It is also noted that the FIG. 1 embodiment shows web or bridge means 30a and 30b at positions between the cavities or cutouts left when the outboard outer roll supports and the inboard outer roll supports were cut out of the support beam itself. These webs or bridges, although optional, have been shown to advantageously add to the structural integrity and hence the load carrying capacity of the idler support beam itself as they supply lateral support to the compression flanges 38a and 38b at the top of the structural contour. It is contemplated that these webs or bridge means could be left out of an idler roll support beam structure in situations where the capacity of the idler roll support beam structure did not dictate that such web or bridge means be incorporated in the final product. Similar web means exist between the inboard outer roll support brackets 26a and 26b and the center roll support brackets 28a and 28b. A central web 34 may also be left between the center roll support brackets as necessary, however it is also expected that such central web means could be left out of an idler roll support beam structure if appropriate in light of the expected load carrying requirements of the idler support beam.

The idler roll support beam is generally formed from a piece of flat stock having a length between mounting pads dictated by the roll size, number of rolls to be supported and the spacing between roll ends needed for a particular application. The width of the support beam is usually much less than the length of the support beam thus yielding a generally rectangular support beam blank particularly before the support beam is further formed to provide the structural contour generally 36 extending along each side of the support beam approximately from mounting pad to mounting pad. This structural contour results from a metal forming operation wherein a support beam blank, preferably after having been perforated with the necessary cutouts for the outer roll support brackets and the center roll support brackets is deformed generally upwardly along the longitudinal axis of the support beam Actually the steps in the manufacturing of the support beam could be performed in any of several orders. For instance, in the preferred embodiment, the steps of forming utilize a six station progressive die. The support beam blank (a rectangular piece of flat stock generally fed from a coiled steel roll) is processed as follows: Punch out apertures in mounting pads; Die cut basic outline of support brackets to form "tabs"; Die cut and punch out tabs to proper final shape; Bend folds in tabs; Press to form structural contours; Bend tabs upwardly. It has been found however that it is best to die cut and punch out the support beam blank before the support beam blank is pressed between forming dies to generate the structural contour 36 referred to above.

The structural contour 36 is a connecting wall surface that connects a central portion of the support beam adjacent the longitudinal center line thereof with respective outboard edges of the support beam. The central portion of the support beam incorporates a compression flange zones such as 38a and 38b. The outboard edges of the blank then become tension flange zones 40a and 40b. In the forming of the contour support wall the center section of the support beam is deformed upwardly relative to a flat plane as represented by the support beam blank prior tot he structural contour being formed. The height of the structural contour or the wall 36 gradually increases from the end portions or mounting pad locations of the support beam to the lateral center or midpoint of the support beam. As shown in FIG. 7 it is not critical that the vertical displacement or the height of the structural contour 36 continuously increases until the midpoint and then continually decrease toward the opposite mounting pad end as stated. Rather, the structural contour could increase to a point intermediate the mounting pad ends and the lateral center point of the support beam and then level off until decreasing again at the other end of the support beam as shown in FIG. 7.

As the structural contour 36 is formed from the support beam blank, which is a generally rectangular flat stock, blank as shown in FIG. 5, at least in a preferred embodiment, it is necessary that the portion between the end portions of the support beam, that is the mounting pad sections, will be decreased in width as shown in the FIG. 6 plan view as well as in FIG. 1 and FIG. 2. In a preferred embodiment the structural contour 36 will project upwardly from flange structure elements such as 40a and 40b, which will be tension flanges, as shown in the figures. These tension flange elements, such as 40, will extend or a portion of the length of the structural contour 36 on each side of the support beam until the flange element tapers off at each end thereof in an area proximate the mounting pad. It should be pointed out that the structural contour 36 has a gradually increasing fall line that starts out as a gentle slope in the vicinity of the mounting pad sections of the support beam. The fall line increases until it is almost vertical and perpendicular to the flange portions 40a and 40b or the compression flange zones 38a and 38b at the top surface of the support beam as represented by the compression ranges and the bridge structures such as 30a, 30b and 34. The complex curve shape of the structural contour, which is generally duplicated on each side of the support beam, can be likened to a ramp structure starting out at either of the mounting pads. A relatively flat ramp gradually increases in height and angle such that the ramp surface is almost perpendicular to the surface in the mounting pad sections by the time the ramp reaches the midpoint area or the central web area of the support beam. Although the preferred embodiment includes a relatively radical, nearly perpendicular, structural contour near the center point area of the support beam it is also contemplated that a more gradual structural contour in the side wall structure would work well in various applications contemplated by the inventors.

FIG. 2 presents an alternative embodiment to the structure shown in FIG. 1 with a departure being the method of supporting the outboard outer roll axle ends. In this alternative, but equally important embodiment, the outboard outer roll support brackets which have been die cut and bent upwardly from the support beam blank are relatively small or short tabs 42a and 42b when compared with the outboard outer roll support brackets 24a and 24b (also referred to as "tabs") shown in FIG. 1. These short tabs, 42a and 42b, in one embodiment as shown in FIGS. 2 and 5, may be provided with plurality of holes therein such as 44 to support and facilitate attachment thereto of outboard outer roll support brackets such as 46a and 46b. These support brackets, 46a and 46b would be provided with holes matching the hole locations 44 in the support tabs 42a and 42b such that these outboard outer roll support brackets 46a and 46b could be bolted, riveted or otherwise attached to the short tabs 42a and 42b. The fastener shown at 48 is simply an example of the type of fasteners used in a preferred embodiment, however it is also recognized that rivels, screws or a weldment could be used to attach the outboard outer roll support brackers 46a and 46b to the outboard outer roll support bracker tabs 42a and 42b.

FIG. 4 presents another alternative embodiment for securing the outboard outer roller support brackets to the short bracket tabs, which in this FIG. 4 embodiment are somewhat different from the tabs 42a and 42b shown in FIG. 2. In the FIG. 4 embodiment the outboard outer roll support bracket 50 is provided with a locking tab 52 in the lower portion of the bracket 50 which will interlock with an aperture 54 in the outboard outer roll support bracket tab 56. Item 50 is the outboard outer roll support bracket prior to assembly into its receiving support tab 56 while FIG. 4 shows the two components mated together. Further structural integrity is provided through the bent over portions 58 on the outboard outer roll support brackets. The receiving outboard outer roll support bracket tab 56 has vertically upstanding channels such as 60 which can conform to the bent flanges 58 on the outboard outer roll support brackets to assist in positively locating such a bracket in the roll support bracket tab 56.

Other embodiments of this connection are possible, for instance the outboard outer roll support bracket need not be provided with bent flanges 58 but could be formed from a flat piece of stock that would be inserted similarly into the roll support bracket tab 56 however the channels 60 Would be formed in a planer relationship to accept the flat outboard outer roll support bracket. Furthermore it is expected that the channels 60 could be "swung inwardly" to accommodate an outboard outermost outer roll which has been formed with inwardly bent side flanges not shown in FIGS. 3 or 4 but which could be easily envisioned by a person having skill in this metal forming art.

The embodiment shown in FIGS. 2 through 7, wherein the upwardly bent tabs for the outboard outer roll support brackets are relatively short as compared to the similar roll support brackers in FIG. 1 allows the use of various different lengths of roll support brackets such as 46 and 50. The necessity for this extra length, or in the various lengths of support brackets, is dictated by the length and angle of the rolls such as 14a and 14b. Where the angle of these rolls is relatively steep there would not be enough material in the support beam blank to provide adequate length for the outboard outer roll support brackets. Consequently a three-part or multiple part idler roll support frame is necessary to accommodate roll units with long outer rolls or high mounting angles of the outer rolls. Both of these embodiments have been found to be nearly equal as far as preferred embodiments are concerned and both embodiments are determined by the necessity of accommodating the required length of the support beam for the length and number of rolls used.

Two embodiments of the invention and several nuances of the design have been shown and discussed. It is contemplated that a person having ordinary skill in the art would utilize design nuances somewhat different from the designs shown herein and such nuances of design are contemplated by the inventors is being covered by this specification. Such nuances of a design are not to be construed as patentably distinct from the invention shown herein and as claimed in the following claims wherein:

What is claimed is:

1. An elongate support beam having mounting pad sections at the ends thereof and a midpoint section between the mounting pad sections and having a major longitudinal axis for use in support one or more than one idler rolls thereon, each idler roll having a major longitudinal axis generally aligned in a vertical plane projecting from the longitudinal axis of said elongate support beam, said support beam having first and second compression flanges gradually increasing in height and angle from the mounting pad sections to the midpoint section of the support beam; and
    at least one pair of roll support brackets extending upwardly from said elongate support beam to support one or more than one idler roll thereon.

2. The invention in accordance with claim 1 wherein said first and second compression flanges are connected together by a web.

3. The invention in accordance with claim 2 wherein portions of said web are directed upwardly to form at least a portion of said support brackets.

4. The invention in accordance with claim 1 wherein said elongated support beam further includes first and second tension flanges between said mounting pad section and adjacent respective first and second compression flanges.

5. The invention in accordance with claim 4 wherein said first and second compression flanges are connected together by a web.

6. The invention in accordance with claim 5 wherein portions of said web are directed upwardly to form at least a portion of said support brackets.

* * * * *